United States Patent [19]

Cornille et al.

[11] 4,026,718
[45] May 31, 1977

[54] FILMS FROM MODIFIED REGENERATED CELLULOSE

[75] Inventors: Georges Cornille, Mariakerke; Roland Jacobs, Wetteren; Walter Bontinck, Sint-Martens-Leerne, all of Belgium

[73] Assignee: U.C.B, Societe Anonyme, Brussels, Belgium

[22] Filed: Sept. 16, 1975

[21] Appl. No.: 614,025

[30] Foreign Application Priority Data

Sept. 16, 1974 United Kingdom ............ 40180/74

[52] U.S. Cl. .............................. 106/168; 264/186; 264/188
[51] Int. Cl.² ......................................... C08L 1/24
[58] Field of Search .................... 106/165–168; 264/191, 188, 186; 260/218; 536/57

[56] References Cited

UNITED STATES PATENTS

| 2,077,412 | 4/1937 | Herzog | 106/164 |
| 3,066,032 | 11/1962 | Fukushima | 264/191 |

FOREIGN PATENTS OR APPLICATIONS 977,945 12/1964 United Kingdom

*Primary Examiner*—Theodore Morris
*Attorney, Agent, or Firm*—Wenderoth, Lind & Ponack

[57] ABSTRACT

A modified regenerated cellulose film comprising regenerated cellulose and certain modified starches is clear and transparent and has substantially the same mechanical and optical properties as conventional unmodified regenerated cellulose films. The modified starches used are starches degraded by oxidation and/or hydrolysis, uncrosslinked ethers or esters of starch or of starches degraded by oxidation and/or hydrolysis or mixtures thereof. The amount of modified starch used represents 1 to 49% by weight, preferably 5 to 30% by weight, based on the total weight of cellulose and modified starch. Methods for the production of said modified regenerated cellulose film either by the viscose process or by the cuprammonium process are also described.

16 Claims, No Drawings

FILMS FROM MODIFIED REGENERATED CELLULOSE

The present invention relates to a modified regenerated cellulose film and to processes for the production thereof.

At present, regenerated cellulose films are manufactured mainly by two processes, the viscose process and the cuprammonium process.

According to the first and most widely used process, regenerated cellulose films are obtained from cellulose by reacting cellulose with an aqueous sodium hydroxide solution to form alkali cellulose which is reacted in a second stage with carbon disulfide in alkaline medium to form cellulose xanthate; the latter is dissolved in an aqueous sodium hydroxide solution to obtain viscose which, after ripening, is extruded into films; thereafter the cellulose is regenerated in acid medium.

According to the second process, the films of regenerated cellulose are also obtained from cellulose. This is imtimately mixed with an aqueous ammoniacal solution or suspension of copper hydroxide or basic copper sulfate to form a clear viscous solution of a complex compound of cellulose, copper and ammonia. This solution is then extruded into films and cellulose is regenerated in basic, acid or neutral medium.

In both these processes, the raw material used is a cellulose paste, called in technology "dissolving cellulose" of very high purity, with a high alpha-cellulose content (over 90%) which is free from lignin and has a low mineral content.

This raw material is a relatively expensive product, the obtaining of supplies of which now poses serious problems for manufacturers of films of regenerated cellulose.

It would, therefore, be very interesting if this raw material could be replaced, at least partly, by another material which poses no problem from the point of view of supplies, provided, however, that the substitute material has no influence either on the characteristics or on the cost of regenerated cellulose obtained and provided it does not create technological problems.

However, many raw materials are incompatible with cellulose and moreover it is extremely difficult to discover a substitute material which allows the manufacture of a transparent film of regenerated cellulose. Thus in the book entitled "The Science and Technology of Polymer Films" edited by O. J. SWEETING, volume 1, Interscience Publishers (1968), page 124, it is stated that "incompatibility with cellulose is exhibited so generally that it is extremely difficult to find additives which do not produce hazy cellophane. In one trial, starch was xanthated and dissolved in caustic solution. When this was blended with viscose in various proportions, the resulting films were hazy if the starch constituted more than 2–3% of the film". It can therefore be concluded that native starch cannot be used as a substitute material of cellulose, as it does not allow the production of transparent films.

It has now been found that certain modified starches constitute excellent substitute materials and that they can partly replace the cellulose used as raw materials in the manufacture of regenerated cellulose films without substantially altering the characteristics of the latter. As opposed to wood cellulose, starch poses few supply problems, since it originates from plants (maize = U.S. corn, wheat, potatoes, tapioca, rice), the harvest of which is abundant and annual.

Thus, it is one object of the invention to provide a modified regenerated cellulose film comprising regenerated cellulose and modified starch, said modified starch consisting of starches degraded by oxidation and/or hydrolysis, uncrosslinked ethers or esters of starch or of starch degraded by oxidation and/or hydrolysis, the amount of modified starch representing 1 to 49% by weight, preferably 5 to 30% by weight, based on the total weight of cellulose and modified starch.

Another object of the invention is to provide a process for the production of a modified regenerated cellulose film, which comprises the steps of (a) reacting carbon disulfide with alkali cellulose, (b) dissolving the cellulose xanthate thus obtained in an aqueous sodium hydroxide solution, (c) ripening the resulting viscose, (d) extruding the ripened viscose and (e) regenerating the cellulose from the ripened and extruded viscose, modified starch being intimately mixed with the cellulose xanthate obtained at the end of step (a) and/or with the viscose during step (b) and/or during step (c).

A third object of the invention is to provide a process for the production of a modified regenerated cellulose film which comprises the steps of (a) preparing a cuprammonium solution from copper hydroxide and an aqueous solution of ammonium hydroxide, (b) dissolving cellulose in the cuprammonium solution, (c) extruding the resulting solution and (d) regenerating the cellulose from the extruded solution, modified starch being added at any moment of step (b).

From the chemical point of view, native starch is a homopolymer, the monomeric unit of which is D-anhydroglucose. These units are linked together by alpha-glucosidic linkages which link the aldehyde group of a glucose unit to a hydroxyl group of a following glucose unit. The predominating link is the 1,4-alpha link. Starch is composed principally of two types of polymers: a linear polymer which has practically exclusively 1,4-alpha links and which is designated by the term amylose, and a branched polymer, called amylopectine, which has, in addition to 1,4-alpha links, a low percentage of 1,6-alpha links. Native starch may be modified by physical or chemical methods or by enzymatic action.

The modified starch used according to the invention may originate from various plants such as maize = U.S. corn, wheat, potato, tapioca, rice and the like. For the manufacture of the films of modified regenerated cellulose according to the invention, use is more particularly made, as modified starch, of starches degraded by oxidation, for example with sodium hypochlorite, hydrogen peroxide, and the like; starches degraded by hydrolysis in the presence of acids such as hydrochloric acid and sulfuric acid; starches modified by etherification such as the hydroxyethylstarches obtained by reacting ethylene oxide with starch, the hydroxypropylstarches obtained by reacting propylene oxide with starch, O-(2-cyanoethyl)starches obtained by reacting acrylonitrile with starch and O-(2-carbamoylethyl)starches prepared by reacting acrylamide with starch; starches modified by esterification such as starch acetates obtained by reacting starch with acetic anhydride or vinyl acetate and starch phosphates prepared by reacting starch with alkali metal salts of phosphoric acid (e.g. monosodium hydrogen phosphate or disodium hydrogen phosphate), with sodium pyrophosphate or sodium tripolyphosphate. Moreover, as modified starch, use may also be made of the above-mentioned esters and ethers, the starch of which is degraded by oxidation and/or hydrolysis. Mixtures of the aforesaid modified starches may also be used.

The starches modified by esterification or etherification, used according to the invention are substances that are not cross-linked, i.e. the individual chains of the starch are not linked together by means of the compounds used for esterification or etherification.

Of course, the modified starch used may contain additives that influence its gelatinization temperature or its viscosity or that exerce a stabilizing effect. It is however to be understood that these additives may not have any deleterious effect on the qualities of the modified regenerated cellulose film.

It has already been proposed to prepare films of regenerated cellulose from mixtures of viscose and of a maize starch having an unusual high anylose content (71%). However, this starch originates from a special genetically-modified maize variety which produces a starch which is exceptionally rich in amylose, contrary to common starch which contains only 15% to 30% by weight of amylose. The drawback of this starch rich in amylose is that supplies thereof are necessarily limited. This is also a product which is much more expensive than conventional starch. The use of this special type of starch rich in amylose is, therefore, outside the scope of the present invention.

According to the present invention, the modified starch may be used in dry form (account being taken, however, of the water content normally present in dry starch), in aqueous suspension or in aqueous solution, which may or may not be alkaline.

When the modified regenerated cellulose film according to the invention is prepared according to the viscose process, the modified starch may be added (i) directly after the xanthation of cellulose, (ii) during the formation and ripening of the viscose and preferably (iii) immediately before the extrusion of the ripened viscose. This addition may also be carried out during one or several of the aforesaid steps.

The films of regenerated cellulose produced by conventional processes are characterized by exceptional optical, mechanical and surface properties as well as by impermeability to gases. As stated above, these characteristics must be maintained. However, for it to be so, modified starch must be added in a specific manner. This addition must be carried out in such a manner that the modified starch does not affect either the filtrability of the solution to be extruded or the transparency of the modified regenerated cellulose film finally obtained.

When the modified starch is used in dry form, it may be added to the cellulose xanthate immediately after it is produced, so that the starch has time to swell and then to dissolve at the time of the dissolution of the cellulose xanthate in the sodium hydroxide solution. The modified starch may also be added in dry form to an already prepared viscose but, in that case account must be taken of the time required for the dissolution of starch before the filtration of the viscose.

When the modified starch is used in the form of an aqueous suspension or of an aqueous solution, which may or may not be alkaline, it may be added at the time of dissolution of the cellulose xanthate in the sodium hydroxide solution, during the ripening of the viscose or immediately before extrusion of the ripened viscose.

The modified starch may be added in one go or in portions. It is also possible to combine the addition of modified starch in dry form with the addition of modified starch in suspension or in solution.

The preparation of the aqueous modified starch suspension or of the aqueous modified starch solution, which may or may not be alkaline, is carried out in conventional manner. During this preparation, temperature may play a part; the temperature used depends, in particular, upon the degree of alkalinity of the water in which the modified starch is dissolved and upon the type of modified starch used. When the alkalinity of the water decreases, dissolution temperature increases and dissolution time becomes longer.

When the modified regenerated cellulose film according to the invention is prepared according to the cuprammonium process, the modified starch may be added in dry form to the cuprammonium solution at the same time as the cellulose before its dissolution therein, during its dissolution therein or after dissolution of the cellulose in the cuprammonium solution is complete; the modified starch may also be added in aqueous suspension or in aqueous solution, which may or may not be alkaline, or it may be added in suspension or in solution in a cuprammonium solution, but in this case, the addition preferably takes place when the cellulose is already dissolved in the cuprammonium solution.

The amount of modified starch used must be such that the conventional properties of the films of regenerated cellulose be maintained. Generally, use may be made of an amount of modified starch of 1 to 49% by weight, preferably of 5 to 30% by weight, based on the total weight of cellulose and modified starch.

The viscose of cellulose or the cuprammonium solution of cellulose to which modified starch is added in accordance with the present invention may obviously contain all the ingredients and additives normally used in the conventional manufacturing processes of regenerated cellulose films.

The modified regenerated cellulose film according to the invention, whether prepared by the viscose or the cuprammonium process is clear and transparent. It has practically the same mechanical and optical properties as a film of regenerated cellulose obtained conventionally without addition of modified starch. Furthermore, the impermeability to gases is fully retained. In addition, taking into account the chemical constitution, the cellulose film according to the invention is more biodegradable than a conventional film of regenerated cellulose. The mechanical properties of the modified regenerated cellulose film according to the invention may be modified in conventional manner with known humectants, for example, glycerol, ethylene glycol, propylene glycol, diethylene glycol, polyglycols, urea, etc.

The viscose process of the present invention has, in addition, the advantage over the conventional viscose process of being more economical and less polluting, since, in particular, a smaller amount of carbon disulfide is used, as the modified starch used is not subjected to xanthation.

Since the modified regenerated cellulose film according to the invention has practically the same characteristics as a film of regenerated cellulose obtained conventionally, it can replace the latter in its applications, in particular in the packing of items of all kinds such as foods, pharmaceuticals, cigarettes, stationery items; as a base for adhesive tapes; as casings, films for dialysis and the like.

The following Examples are given for the purpose of illustrating the present invention.

In these Examples, the properties of the films obtained have been measured by the following methods:

Tensile strength at break:
ASTM D 882-67, rate of grip separation (on Instron 1062): 50 mm/minute; initial grip separation: 10 cm; results expressed in newtons per mm$^2$ (N/mm$^2$), Elongation:
ASTM D 882-67, rate of grip separation (on Instrom 1062): 50 mm/minute; initial grip separation: 10 cm; results expressed in %, Modulus of elasticity:
ASTM D 882-67, rate of grip separation (on Instron 1062): 25 mm/minute; initial grip separation: 25 cm; results expressed in newtons per mm$^2$ (N/mm$^2$)

Haze:
ASTM D 1003-61, the percentage of transmitted light which, in passing through the film, deviates by more than 2 degrees on the average; results expressed in %, Transparency:
ASTM D 1003-61, the percentage of light, which passes through the film within an angle of 0.1 degree on the average; results expressed in %.

These properties have been measured on films conditioned at a temperature of 20° C. and at 50% relative humidity.

The modified starches used in the Examples originate from G. R. AMYLUM, N.V.

EXAMPLE 1

In this Example, use is made of a maize starch, degraded by oxidation and hydrolysis in aqueous suspension with sodium hypochlorite which has the following characteristics: intrinsic viscosity: 0.30 dl/g determined in 1 N sodium hydroxide solution at 25° C.; carboxyl group content: 15 milliequivalents per 100 g of dry material; alkaline fluidity: 83 (alkaline fluidity refers to the number of milliliters of an alkaline solution (0,5 N NaOH) of 10 g of starch which pass through a calibrated orifice in the time required by 100 ml of distilled water to pass through the same orifice).

A 9% by weight aqueous solution of this starch is prepared by dissolution in water, while stirring, for 15 minutes at a temperature of 95° C., followed by treatment in an autoclave at 120° C. for 15 minutes. After the solution obtained has cooled, 20 parts by weight thereof are added to 80 parts by weight of viscose prepared in standard manner and containing 9% by weight of cellulose, 2.2% by weight of total sulfur and 5.7% by weight of sodium hydroxide. After ripening at ambient temperature the viscose thus obtained until it reaches a degree of substitution of the xanthate of the order of 0.30, and degassing it in free air, also at ambient temperature, it is cast on to a glass plate at a thickness of 125 micrometers. The glass plate is then immersed in an aqueous solution containing 9% by weight of sulfuric acid and 20% by weight of sodium sulfate at a temperature of 40° C., until coagulation and regeneration of the coating on the plate is complete. The resulting film is stripped from the plate, washed with water, a 0.5% by weight aqueous sodium hydroxide solution and again with water and then bleached with a sodium hypochlorite solution. After a final washing with demineralized water until neutral, the film is plasticized in a 5% by weight aqueous solution of propylene glycol at a temperature of 25° C. Finally, the film obtained is dried on a frame under isotropic tension at 100° C.

The film obtained is clear and transparent; it contains 19% by weight of starch, calculated on the total amount of cellulose and starch. In Table I below, the mechanical and optical properties of the obtained film are given.

EXAMPLE 2

This Example illustrates the use of O-(2-cyanoethyl)-starch (degree of substitution: 0.04) obtained by reacting acrylonitrile with maize starch, previously degraded by hydrolysis in an aqueous suspension with sulfuric acid; this degraded starch has an intrinsic viscosity of 0.37 dl/g (measured in 1 N NaOH solution at 25° C.) and an alkaline fluidity of 82.

2.5 parts by weight of O-(2-cyanoethyl)starch in powder form (containing 12% by weight moisture) were introduced, while stirring, into 100 parts by weight of viscose prepared in conventional manner and containing 9% by weight of cellulose, 2.2% by weight of total sulfur and 5.7% by weight of sodium hydroxide. Ripening and degassing of the viscose thus obtained were carried out and a film was formed in the manner described in Example 1.

The film obtained has substantially the same properties as that prepared in Example 1. It contains 18% by weight of cyanoethylstarch, calculated on the total amount of cellulose and cyanoethylstarch. In Table I below, the mechanical and optical properties are given.

EXAMPLE 3

According to the process described in Example 1, there is prepared a 4.5% aqueous solution of hydroxypropylstarch (degree of substitution: 0.03) obtained by reacting propylene oxide with maize starch.

50 parts by weight of this solution are added to 75 parts by weight of ripened viscose, normally ready for extrusion, containing 9% by weight of cellulose (degree of substitution of the xanthate: 0.30). During this addition, the introduction of air into the viscose is avoided by operating under a vacuum of 100 mm. Hg. A film is then prepared in the manner described in Example 1. The film obtained has properties similar to those of the film prepared in Example 1. It contains about 25% by weight hydroxypropylstarch, calculated on the total weight of cellulose and hydroxypropylstarch. In Table I below, its mechanical and optical properties are given.

EXAMPLE 4

The maize starch degraded by oxidation and hydrolysis with sodium hypochlorite described in Example 1 is used.

Cellulose xanthate is prepared by reacting for 60 minutes at 36–37° C. 1500 parts by weight of alkali cellulose prepared in conventional manner and containing 34.3% by weight of cellulose and 14.6% by weight of sodium hydroxide, with 146 parts by weight of carbon disulfide.

51 parts by weight (dry basis) of the degraded starch in powder form are mixed while stirring, for about 10 minutes with the thus obtained cellulose xanthate. The mass is cooled and, within about one hour, 3,496 parts by weight of an aqueous sodium hydroxide solution containing 2.59% by weight of NaOH and further 461 parts by weight of water and gradually introduced therein. The mixture is left to react for about one hour. A viscose is thus obtained which contains, according to analysis, 9.82% by weight of starch and cellulose, 2.16% by weight of total sulfur and 5.55% by weight of sodium hydroxide. After ripening the thus obtained viscose at ambient temperature for 48 hours until it reaches a degree of xanthate substitution of about 0.30 and degassing thereof in free air, a film is prepared according to the method of Example 1.

The film thus obtained has the properties given in Table I below. It contains about 9% by weight of starch, calculated on the total amount of cellulose and starch.

EXAMPLE 5

In this Example, starch phosphate is used (containing 0.178% by weight of phosphorus or 0.407% by weight of phosphorus pentoxide), obtained by reacting maize starch with sodium tripolyphosphate.

11.3 parts by weight of starch phosphate (containing 13% by weight moisture) are dispersed, at room temperature, in 63.7 parts by weight of water. To this dispersion, 25 parts by weight of a 20% by weight sodium hydroxide solution are added and the mixture is stirred until dissolution of the starch phosphate is complete. An aqueous solution is thus obtained containing 10% by weight of starch phosphate and 5% by weight of sodium hydroxide.

10 parts by weight of this solution are mixed with 100 parts by weight of already ripened viscose (containing 9% by weight of cellulose), having reached a degree of xanthate substitution of 0.30 after 48 hours ripening. A starch phosphate/cellulose proportion by weight of 10:90 is thus obtained.

The obtained mixture is cast on a glass plate in a thickness of 125 micrometers. Then, the glass plate is immersed for 2 minutes in an aqueous solution containing 14% by weight of sulfuric acid and 21% by weight of sodium sulfate at a temperature of 45° C., until coagulation and regeneration of the coating on the plate is complete. The resulting film is stripped from the plate and washed for 30 minutes with running water. The film is finally plasticized by immersion for 10 seconds at a temperature of 20° C. in a 5% by weight aqueous solution of glycerol. Excess liquid is removed by means of a filter paper and the moist film is dried on a frame under isotropic tension for about 15 minutes at 100° C.

The film thus obtained has the properties given in Table I below.

The mechanical and optical properties of the film obtained in Examples 1 to 5 have been assembled in Table I hereunder. For comparative purposes, the last column gives the properties of a film prepared under the conditions of Example 1 from unmodified viscose.

TABLE I

| Properties of the film | Example 1 | Example 2 | Example 3 | Example 4 | Example 5 | Control |
|---|---|---|---|---|---|---|
| Tensile strength at break (N/mm$^2$) | 67 | 59 | 64 | 68 | 51 | 65 |
| Elongation (%) | 13 | 5 | 15 | 12 | 12 | 15 |
| Modulus of elasticity (N/mm$^2$) | 3,900 | 3,800 | 3,800 | 3,000 | 3,100 | 3,800 |
| Haze (%) uncoated | 15 | 4 | 4 | 8 | 23 | 2 |
| coated+ | 4 | 12 | 23 | 7 | 7 | 3 |
| Transparency (%) uncoated | 38 | 41 | 53 | 47 | 54 | 55 |
| coated+ | 61 | 45 | 50 | 52 | 60 | 35 |

+the film was coated with a varnish based on a 84:15:1 vinyl chloride-vinyl acetate-maleic acid copolymer (a 25% solution in methyl ethyl ketone), and was dried for 30 seconds at 80° C.

EXAMPLE 6

This Example illustrates the manufacture on industrial scale of a modified regenerated cellulose film according to the invention. The maize starch, oxidized and hydrolyzed with sodium hypochlorite of Example 1 is used.

150 kg of this starch (dry basis) are dispersed in 412.5 kg water and the dispersion is stirred for 15 minutes at a temperature of about 13° C.; 187.5 kg of a 20% by weight aqueous sodium hydroxide solution are then gradually added while stirring continuously. Stirring is pursued for another 5 minutes. An aqueous solution is obtained containing 5% by weight of sodium hydroxide and 20% by weight of starch.

The solution thus obtained is filtered by means of filter-presses provided with linen conventionally used in the industry of regenerated cellulose films production. It is then degassed.

By means of a metering pump, the filtered and degassed starch solution is introduced into the viscose circuit of an industrial plant for the production of regenerated cellulose films. The introduction is made at a place preceding the last filtration of the viscose before the extruder, i.e. when the viscose has finished its ripening and has reached a degree of xanthate substitution of about 0.30.

In the viscose circuit, after the introduction of starch, a mixer has been provided in order to perfect homogenization of the starch in the viscose. Further a system has been provided for regulating the speed of introduction of the starch in function of the speed of extrusion of the film. To this end, the motor of the metering pump is connected to a control system, which in turn is connected to a device measuring the speed of extrusion of the film. In this way it is possible to maintain the starch:cellulose proportion by weight constant, independently of the speed of extrusion of the film.

In this Example, the starch:cellulose proportion by weight is maintained at 10:90.

The subsequent extrusion, coagulation, regeneration and film washing operations are carried out in conventional manner. After filtration, the viscose containing the starch is extruded, then it is passed in a coagulation bath containing 170 g sulfuric acid and 280 g of sodium sulfate per liter, at a temperature of 40°–45° C. The film obtained is washed respectively in water, in an 0.5% by weight aqueous NaOH solution and again in water; then it is bleached in a sodium hypochlorite solution. After a last washing in demineralized water until neutral, the film is plasticized in a bath containing an aqueous solution of glycerol, diethylene glycol and urea in a 6:3:1 proportion by weight.

Finally, the film is dried in a oven equipped with heated cylinders.

In Table II below, the main characters of the film obtained are given.

EXAMPLE 7 to 12

In these Examples, the method of Example 6 is followed. However, in Example 7, the starch:cellulose proportion by weight is 30:70, whereas in Examples 8 to 11, this proportion is 5.95.

On the other hand, the following modified starches are used:

Example 7:
  maize starch, degraded by oxidation and hydrolysis with sodium hypochlorite used in Example 1;
Examples 8 and 9:
  maize starch, degraded by oxidation and hydrolysis in aqueous suspension with sodium hypochlorite, having an intrinsic viscosity of 0.82 dl/g (determined in a 1 N NaOH solution at 25° C.) and an alkaline fluidity of 36;
Example 10:
  maize starch, degraded by hydrolysis in aqueous suspension with sulfuric acid, having an intrinsic viscosity of 0.41 dl/g (determined in a 1 N NaOH solution at 25° C.) and an alkaline fluidity of 75;
Examples 11 and 12:
  maize starch, degraded by hydrolysis in aqueous suspension with sulfuric acid, having an intrinsic viscosity of 0.90 dl/g (determined in a 1 N NaOH solution at 25° C.) and an alkaline fluidity of 40–45.

The mechanical and optical properties of the films obtained in Examples 6 to 12 have been assembled in Table II hereunder. For the purpose of comparison, the last column gives the properties of a film prepared under the conditions described in Example 6 from unmodified viscose.

optical properties of conventional regenerated cellulose films obtained from unmodified viscose.

EXAMPLE 13 to 16

In these Examples, the method and conditions described in Example 6 are followed, but the following starches modified by etherification or esterification are used:

Example 13:
  hydroxypropylstarch (degree of substitution: 0.10), obtained by reacting maize starch with propylene oxide;
Example 14:
  hydroxypropylstarch (degree of substitution: 0.10), obtained by reacting propylene oxide with maize starch, which has previously been degraded by hydrolysis in aqueous suspension with sulfuric acid; this degraded starch has an intrinsic viscosity of 0.41 dl/g (measured in a 1 N NaOH solution at 25° C.) and an alkaline fluidity of 75;
Example 15:
  starch acetate (degree of substitution: 0.09) obtained by reacting acetic anhydride with maize starch, previously degraded by hydrolysis in aqueous suspension with sulfuric acid; this degraded starch has an intrinsic viscosity of 0.41 dl/g (measured in 1 N NaOH solution at 25° C.) and an alkaline fluidity of 75;
Example 16:
  O-(2-carbamoylethyl)starch (degree of substitution: 0.33) obtained by reacting acrylamide with maize starch.

In all these Examples, the alkaline aqueous solution of starch introduced into the viscose circuit contains 20% by weight of starch as in Example 6, except in Example 13, where a 5% by weight solution of hydroxypropylstarch has been used and in Example 16, where a 10% by weight solution of O-(2-carbamoylethyl)-starch has been used.

The mechanical and optical properties of the films obtained in Examples 13 to 16 have been assembled in Table III hereunder. For purposes of comparison, the

TABLE II

| Properties of the film | | Ex. 6 | Ex. 7 | Ex. 8 | Ex. 9 | Ex. 10 | Ex. 11 | Ex. 12 | Control |
|---|---|---|---|---|---|---|---|---|---|
| Tensile strength at break (N/mm²) | | | | | | | | | |
| | M/D | 100 | 80 | 110 | 120 | 120 | 112 | 108 | 110 |
| | T/D | 54 | 40 | 54 | 58 | 65 | 63 | 55 | 60 |
| Elongation (%) | M/D | 21 | 9 | 21 | 17 | 20 | 25 | 21 | 23 |
| | T/D | 62 | 22 | 56 | 53 | 48 | 45 | 56 | 65 |
| Modulus of elasticity (N/mm²) | | | | | | | | | |
| | M/D | 4,000 | 5,400 | 4,300 | 5,400 | 4,900 | 4,900 | 4,500 | 4,600 |
| | T/D | 2,000 | 3,900 | 2,400 | 2,800 | 2,800 | 2,800 | 2,300 | 2,700 |
| Haze (%) | uncoated | 2 | 15 | 3 | 2 | 1 | 1 | 2 | 1 |
| | coated+ | 2 | 5 | 9 | — | 2 | 2 | 3 | 2 |
| Transparency (%) | uncoated | 78 | 65 | 80 | 82 | 83 | 80 | 81 | 80 |
| | coated+ | 78 | 70 | 82 | — | 78 | 80 | 75 | 80 |

M/D = machine direction
T/D = transversal direction   +The film has been coated with a varnish based on a vinylidene chloride-acrylonitrile copolymer containing about 91% vinylidene chloride (a 14% by weight solution in a 65/35 by weight mixture of tetrahydrofurane and toluene).

From Table II, it results clearly that in spite of the presence of starches degraded by oxidation and/or hydrolysis in the viscose, clear and transparent cellulose films are obtained which have the mechanical and last column gives the properties of a film prepared under the conditions described in Example 6 from unmodified viscose.

TABLE III

| Properties of the film | | Ex. 13 | Ex. 14 | Ex. 15 | Ex. 16 | Control |
|---|---|---|---|---|---|---|
| Tensile strength at break (N/mm²) | M/D | 104 | 115 | 80 | 73 | 110 |

TABLE III-continued

| Properties of the film | | Ex. 13 | Ex. 14 | Ex. 15 | Ex. 16 | Control |
|---|---|---|---|---|---|---|
| Elongation (%) | T/D | 56 | 63 | 40 | 40 | 60 |
| | M/D | 24 | 15 | 19 | 15 | 23 |
| | T/D | 65 | 39 | 52 | 39 | 65 |
| Modulus of elasticity (N/mm$^2$) | M/D | 3,300 | 4,800 | 4,000 | 3,100 | 4,600 |
| | T/D | 2,800 | 2,700 | 2,200 | 1,700 | 2,700 |
| Haze (%) | uncoated | 3 | 2 | 2 | 19 | 1 |
| | coated+ | 10 | 2 | 4 | 6 | 2 |
| Transparency (%) | uncoated | 75 | 80 | 73 | 79 | 80 |
| | coated+ | 80 | 83 | 78 | 81 | 80 |

M/D = machine direction
T/D/ = transversal direction
+The film has been coated with a varnish based on vinylidene chloride-acrylonitrile copolymer, containing about 1% vinylidene chloride (a 14% by weight solution in a 65/35 by weight mixture of tetrahydrofurane and toluene).

From the Table it can be seen that the mechanical and optical properties of the films obtained are practically identical with those of conventional regenerated cellulose films obtained from unmodified viscose.

EXAMPLE 17

The method and conditions of Example 6 are followed, but a 45:55 starch; cellulose proportion by weight is used.

The film obtained has the following mechanical and optical properties:

| Tensile strength at break (N/mm$^2$) | | M/D | 87 |
|---|---|---|---|
| | | T/D | 48 |
| Elongation (%) | | M/D | 8 |
| | | T/D | 22 |
| Modulus of elasticity (N/mm$^2$) | | M/D | 3,700 |
| | | T/D | 2,000 |
| Haze (%) | uncoated | | 53 |
| | coated+ | | 25 |
| Transparency (%) | uncoated | | 20 |
| | coated+ | | 50 |

M/D = machine direction
T/D = transversal direction
+The film was coated with the varnish used in Examples 6 to 16.

The optical properties of the film obtained are not as good as those of the conventional regenerated cellulose films obtained from unmodified viscose. However, since the mechanical properties of the film are acceptable, it can be used in all the applications where the optical requirements are less drastic, as for example as interleaves between meat or cheese slices, in the confection of sanitary towels, as semi-permeable membranes for dialysis apparatuses, as sausage casings, and the like.

EXAMPLE 18

This Example illustrates the use of a starch derivative originating from potatoes. A hydroxyethylstarch is used (degree of substitution: 0.03), obtained by reacting ethylene oxide with potato starch, previously degraded by oxidation in aqueous suspension with sodium hypochlorite; this degraded starch has an intrinsic viscosity of 0.7 dl/g (measured in 1 N NaOH solution at 25° C.).

The method of Example 5 is followed. A clear and transparent film is obtained which has the following properties:

| Tensile strength at break (N/mm$^2$) | | 70 |
|---|---|---|
| Elongation (%) | | 12 |
| Modulus of elasticity (N/mm$^2$) | | 3,500 |
| Haze (%) | uncoated | 4 |
| | coated+ | 3 |
| Transparence (%) | uncoated | 82 |
| | coated+ | 71 |

+The film was coated with the same varnish as that used in Examples 1 to 5.

It can be seen that the obtained film has properties that are comparable with those of conventional regenerated cellulose films, obtained from unmodified viscose.

EXAMPLE 19

In this Example, the optical properties of a regenerated cellulose film containing a modified starch are compared with those of a regenerated cellulose film containing unmodified native starch. The modified starch used is the maize starch, degraded by oxidation and hydrolysis with sodium hypochlorite, used in Example 1. For the comparison use is made of a native maize starch.

The method of Example 5 is followed; for each type of starch, one test is carried out with a starch: cellulose proportion by weight of 10:90 and another test with a proportion by weight of 30:70.

The optical properties of the films obtained are given in Table IV hereunder. In the first two columns, the properties are compared for the 10:90 starch:cellulose proportion by weight, whereas in the last two columns, those of the 30:70 starch:cellulose proportion by weight are compared.

TABLE IV

| Properties of the uncoated film | 10:90 proportion | | 30:70 proportion | |
|---|---|---|---|---|
| | oxidized starch | native starch | oxidized starch | native starch |
| Haze (%) | 6 | 20 | 16 | 45 |
| Transparency (%) | 74 | 56 | 62 | 19 |

Table IV shows the superiority of the optical properties of the cellulose films containing starch degraded by oxidation over those of the cellulose films containing native starch.

EXAMPLE 20

This Example illustrates the preparation of a modified regenerated cellulose film according to the invention by the cuprammonium process. A maize starch degraded by oxidation and hydrolysis with sodium hypochlorite described in Example 1 is used.

A cuprammonium solution is prepared from a concentrated, 29%, ammonium hydroxide solution and solid copper hydroxide according to the method described by H. F. LAUNER and W. K. WILSON in Anal.Chemistry,22, (1950), 455–58.

Copper hydroxide (Cu(OH)$_2$) has been obtained in the following manner: 250 g of copper sulfate (CuSO$_4$. 5 H$_2$O) are dissolved in approximately 2 liters of hot distilled water. The solution is heated to boiling and concentrated ammonium hydroxide is slowly added with vigorous stirring until the solution is fairly alkaline to litmus paper. The precipitate is let to settle and is washed by decantation with 1 liter portions of distilled water, four times with hot water and twice with cold. Sufficient cold water is then added to make the volume of the slurry 1.5 liters; this is cooled below 20° C; and 850 ml of cold 20% NaOH solution are added slowly with vigorous stirring. The precipitated Cu(OH)$_2$is washed with distilled water by decantation until the washings are colorless to phenolphthalein indicator, and give no precipitation of sulfate upon addition of BaCl$_2$ solution.

5.4 g of dry cellulose and 0.6 g of dry degraded maize starch are dissolved in 100 ml of the cuprammonium solution, in the presence of 10 g of metallic copper and 0.8 g of cuprous chloride (Cu$_2$Cl$_2$); to obtain this dissolution, the mixture is shaken for 12 hours at room temperature.

The mixture is cast on a glass plate in a thickness of 125 micrometers. Then, the glass plate is immersed for 2 minutes in an aqueous solution containing 180 g of sulfuric acid and 280 g of sodium sulfate per liter at a temperature of 45° C., until coagulation and regeneration of the coating on the glass plate is complete. The resulting film is stripped from the plate and washed for 10 minutes with running water. The film is finally plasticized by immersion for 10 seconds in a 5% by weight aqueous solution of glycerol at a temperature of 20° C. Excess liquid is removed with filter paper and the moist film is dried on a frame under isotropic tension at 50° C.

A clear and transparent film is obtained which has practically the same characteristics as a film obtained under the same conditions without addition of degraded starch.

We claim:

1. A clear, transparent modified regenerated cellulose film, which comprises regenerated cellulose and modified starch selected from the group consisting of starches degraded by oxidation, starches degraded by hydrolysis, starches degraded by oxidation and hydrolysis, uncrosslinked starch ethers and uncrosslinked starch esters, the starch of said ethers and esters being native starch or starch degraded by oxidation and/or hydrolysis, the amount of modified starch representing 1 to 49% by weight based on the total weight of cellulose and modified starch.

2. A modified regenerated cellulose film according to claim 1, wherein the amount of modified starch represents 5 to 30% by weight based on the total weight of cellulose and modified starch.

3. A modified regenerated cellulose film according to claim 1, wherein the modified starch originates from maize, wheat, potato, tapioca or rice.

4. A modified regenerated cellulose film according to claim 1, wherein the modified starch is a starch degraded by oxidation and hydrolysis with sodium hypochlorite or hydrogen peroxide.

5. A modified regenerated cellulose film according to claim 1, wherein the modified starch is a starch degraded by hydrolysis with sulfuric acid or hydrochloric acid.

6. A modified regenerated cellulose film according to claim 1, wherein the modified starch is selected from the group consisting of hydroxyethylstarches, hydroxypropylstarches, O-(2-cyanoethyl)starches, O-(2-carbamoylethyl)starches, starch acetates and starch phosphates.

7. A modified regenerated cellulose film according to claim 1, wherein the modified starch is selected from the group consisting of hydroxyethylstarches, hydroxypropylstarches, O-(2-cyanoethyl)starches, O-(2-carbamoylethyl)starches, starch acetates and starch phosphates, the starch being a starch degraded by oxidation and/or hydrolysis.

8. A process for the production of a clear, transparent modified regenerated cellulose film which comprises the steps of (a) reacting carbon disulfide with alkali cellulose to produce cellulose xanthate, (b) dissolving the cellulose xanthate thus obtained in an aqueous sodium hydroxide solution, (c) ripening the resulting viscose, (d) extruding the ripened viscose and (e) regenerating the cellulose from the ripened and extruded viscose, intimately mixing modified starch with the cellulose xanthate obtained at the end of step (a) and/or with the viscose during step (b) and/or during step (c), said modified starch consisting of starches degraded by oxidation and/or hydrolysis, or uncrosslinked ethers or esters of starch or of starch degraded by oxidation and/or hydrolysis, the amount of modified starch representing 1 to 49% by weight based on the total weight of cellulose and modified starch.

9. The process of claim 8, wherein the amount of modified starch used represents 1 to 49% by weight, based on the total weight of cellulose and modified starch.

10. The process of claim 8, wherein the amount of modified starch used represents 5 to 30% by weight, based on the total weight of cellulose and modified starch.

11. The process of claim 8, wherein the modified starch is used in dry form.

12. The process of claim 8, wherein the modified starch is used in the form of an aqueous solution or suspension or an alkaline aqueous solution.

13. A process for the production of a clear, transparent modified regenerated cellulose film which comprises the steps of (a) preparing a cuprammonium solution from copper hydroxide and an aqueous solution of ammonium hydroxide, (b) dissolving cellulose in the cuprammonium solution, (c) extruding the resulting solution and (d) regenerating the cellulose from the extruded solution, adding modified starch at any moment of step (b), said modified starch consisting of starches degraded by oxidation and/or hydrolysis, or uncrosslinked ethers or esters of starch or of starch degraded by oxidation and/or hydrolysis, the amount of modified starch representing 1 to 49% by weight based on the total weight of cellulose and modified starch.

14. The process according to claim 13, wherein the amount of modified starch used represents 1 to 49% by weight, based on the total weight of cellulose and modified starch.

15. The process according to claim 13, wherein the amount of modified starch used represents 5 to 30% by weight, based on the total weight of cellulose and modified starch.

16. The process according to claim 13, wherein the modified starch is used in dry form.

* * * * *